United States Patent [19]
Francioni

[11] Patent Number: 6,006,892
[45] Date of Patent: Dec. 28, 1999

[54] DEVICE FOR FORMING GROUPS OF ARTICLES IN CONVEYOR SYSTEMS, FOR EXAMPLE, FOR AUTOMATIC PACKAGING PLANTS

[75] Inventor: Renzo Francioni, Prato Sesia, Italy

[73] Assignee: Cavanna S.P.A., Novara, Italy

[21] Appl. No.: 08/883,879

[22] Filed: Jun. 27, 1997

[30] Foreign Application Priority Data

Jul. 5, 1996 [IT] Italy .................................. TO96A0579

[51] Int. Cl.[6] .................................................. B65G 47/26
[52] U.S. Cl. ................................... 198/419.2; 198/419.3; 53/537
[58] Field of Search ............................. 198/419.2, 419.3; 53/531, 537, 543

[56] References Cited

U.S. PATENT DOCUMENTS

| | | | |
|---|---|---|---|
| 1,976,855 | 10/1934 | McKee et al. | 198/419.2 |
| 2,073,097 | 3/1937 | Dziedzic et al. | 198/419.2 |
| 2,358,283 | 9/1944 | Walter | 198/419.2 |
| 3,513,629 | 5/1970 | Hoagland et al. | 53/537 |
| 3,872,647 | 3/1975 | Langen et al. | 198/419.3 |
| 4,411,353 | 10/1983 | McDole | 198/419.3 |
| 5,667,055 | 9/1997 | Gambetti | 198/419.3 |

FOREIGN PATENT DOCUMENTS

| | | |
|---|---|---|
| 974995 | 11/1964 | United Kingdom . |
| 1151789 | 5/1969 | United Kingdom . |
| 1438531 | 6/1976 | United Kingdom . |

*Primary Examiner*—Joseph E. Valenza
*Attorney, Agent, or Firm*—Trask, Britt & Rossa

[57] ABSTRACT

Groups, separated by periodic spaces and each containing n articles gathered together, are formed from a regular flow of articles. This result is achieved by means of a thrust element which periodically penetrates the input flow of articles, bringing about the desired accumulation as a result of a forward acceleration or thrust performed beginning with the articles which are to be in the upstream position, in the direction of advance of the articles, within each group. The preferred application is for automatic packaging plants.

10 Claims, 2 Drawing Sheets

DEVICE FOR FORMING GROUPS OF ARTICLES IN CONVEYOR SYSTEMS, FOR EXAMPLE, FOR AUTOMATIC PACKAGING PLANTS

DESCRIPTION

The present invention relates to devices for forming groups of articles according to the preamble to claim 1.

The invention has been developed with particular attention to its possible use in plants for the automatic packaging of products such as food products, especially for forming multiple packages of the type generally known as "multipacks". This possible application, to which extensive reference will be made in the following description, should not, however, be interpreted as limiting of the scope of the invention.

In a plant for forming multipack packages, the individual articles being packaged (each constituted by a respective product or group of products, for example, one or more bars of chocolate already inserted in a package generally known as a "flow-pack") are grouped for subsequent insertion in a further, larger "flow-pack" package. The articles to be grouped are usually brought to the input of the machine forming the multiple packages in the form of a continuous flow of articles which are substantially gathered together (although without appreciable contact and/or compression stresses). In order to produce the multiple package, it is therefore necessary to create, in the continuous flow, evenly-spaced intervals or spaces in which the continuous tubular wrapper which is to define the multipack package can be subjected to the action of the sealing and cutting elements (so-called "jaws") which form the end closure regions of the individual multipack packages.

The solutions conventionally used in the art to solve this problem can be reduced to two basic approaches, these are: solutions in which empty spaces corresponding to a missing article are created in the input flow in various ways, and solutions to which the preamble to claim 1 relates, in which the flow of articles introduced into the tubular wrapper which is to form the multipack is subjected to a periodic slowing of one article in n; naturally, n identifies the number of articles included in the group to be inserted in an individual multipack package.

The first solution has often been found quite difficult to carry out in terms of plant; in particular, it is somewhat inflexible in terms of the ways in which it is implemented. This applies particularly to the capacity for selective variation of i) the widths of the spaces selectively created in the input flow and ii) the number n of articles included between two spaces. When this solution is implemented within conveyor devices for positively entraining the products (for example, conveyors with toothed chains having entrainment teeth or dogs for each article transported), the variations mentioned above almost invariably require an operation to replace parts of the conveyor unit. This aspect is usually undesirable to users who have an ever more pressing desire to be able to vary the operating criteria of the machine (so-called "change of format") without the need to replace parts.

Implementation of the second solution (with the slowing or—most frequently—the momentary stoppage of the input flow of articles in selectively determined positions) becomes difficult as the speed of advance of the input articles increases. With high speeds, periodic slowing or stoppage is liable to lead to impacts, bouncing and misalignment of the articles with consequent loss of the desired precise location when they are inserted in the tubular wrapper defining the multipack package.

The object of the present invention is to provide a device in which the aforementioned problems are solved safely and reliably.

According to the present invention, the possible field of application of which is not, however, limited to the specific field referred to above, this object is achieved by means of a device having the specific characteristics recited in the following claims.

The invention will now be described, purely by way of non-limiting example, with reference to the appended drawings, in which:

FIGS. 1 and 2 show part of a packaging plant of the type currently used for forming packages known as "multipacks". The general characteristics of this plant are well known in the art; since they are well known, the general structure and characteristics of the plant shown in FIGS. 1 and 2 will be described in basic terms and only in so far as they are useful for an understanding of the invention.

Figure 1:
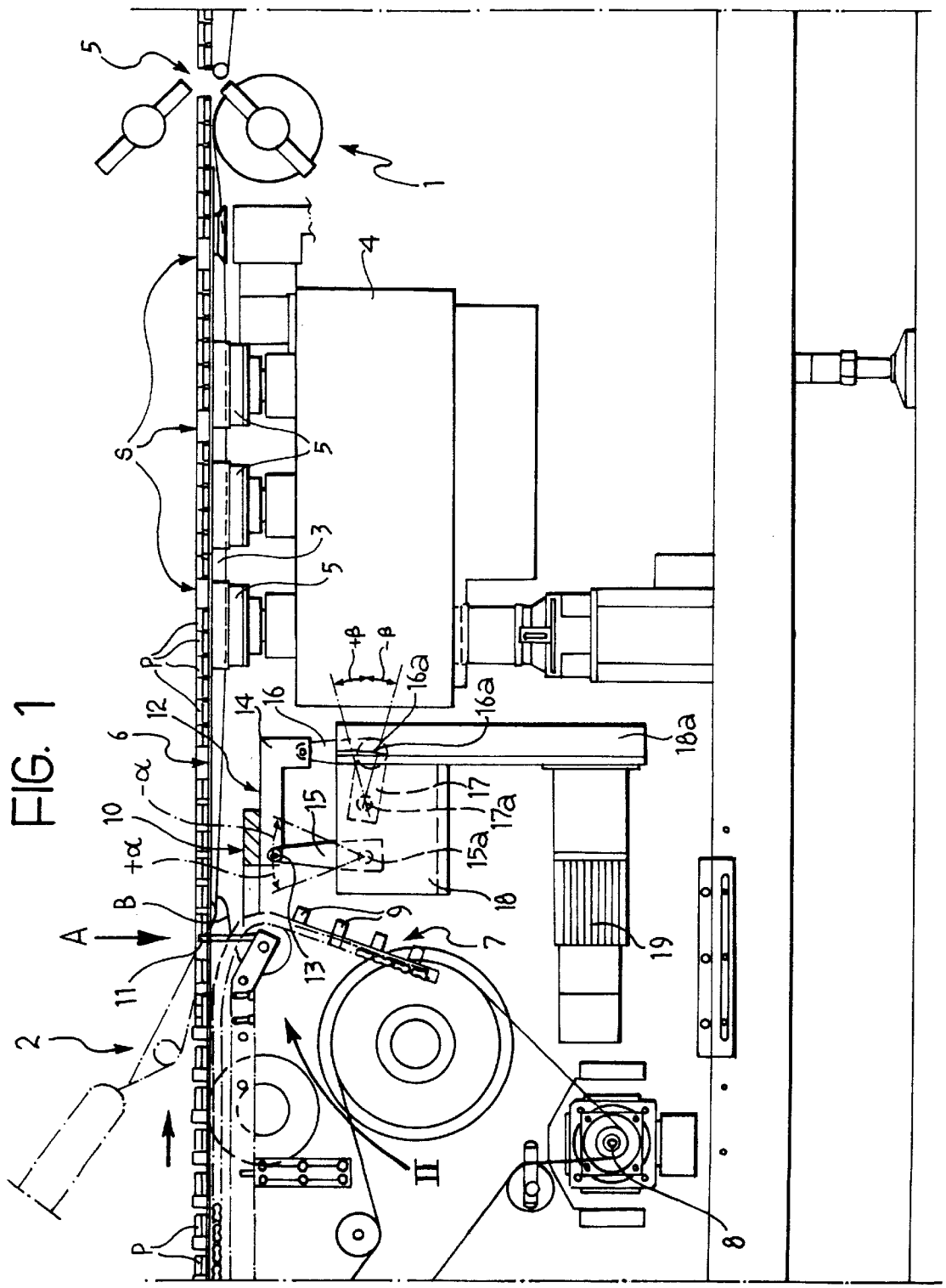
FIG. 1 is a general side elevational view of a device according to the invention.

Briefly, FIG. 1 shows the portion of a multipack packaging machine situated immediately upstream of the (or the first) sealing and cutting unit 1 (of the type with rotary jaws in the embodiment illustrated) which forms the regions of the end seals (the so-called "bellows") of respective multipack packages. The packages in question are formed from a sheet material such as, for example, laminated plastics, aluminium, paper, etc. The sheet material is drawn from a supply (not shown) and is passed through a shaping device 2 so as to form a semi-finished tubular wrapper. This is closed firmly in the manner of a tube along a longitudinal seal line 3 by a sealing unit 4 comprising several pairs of opposed sealing wheels 5 situated beneath the general sliding surface 6 on which the articles P to be inserted in the multipack package advance.

The term "multipack" indicates precisely that each of the articles P is in turn constituted by a product or by a group of products (for example, one or more bars of chocolate) already inserted in respective flow-pack packages formed in a packaging station situated upstream (not shown in the drawings).

Clearly, however, the solution according to the invention is suitable in general for forming groups of articles P of any kind. In other words, they may very well be "bare" articles which have not previously been inserted in respective packages.

Figure 2:
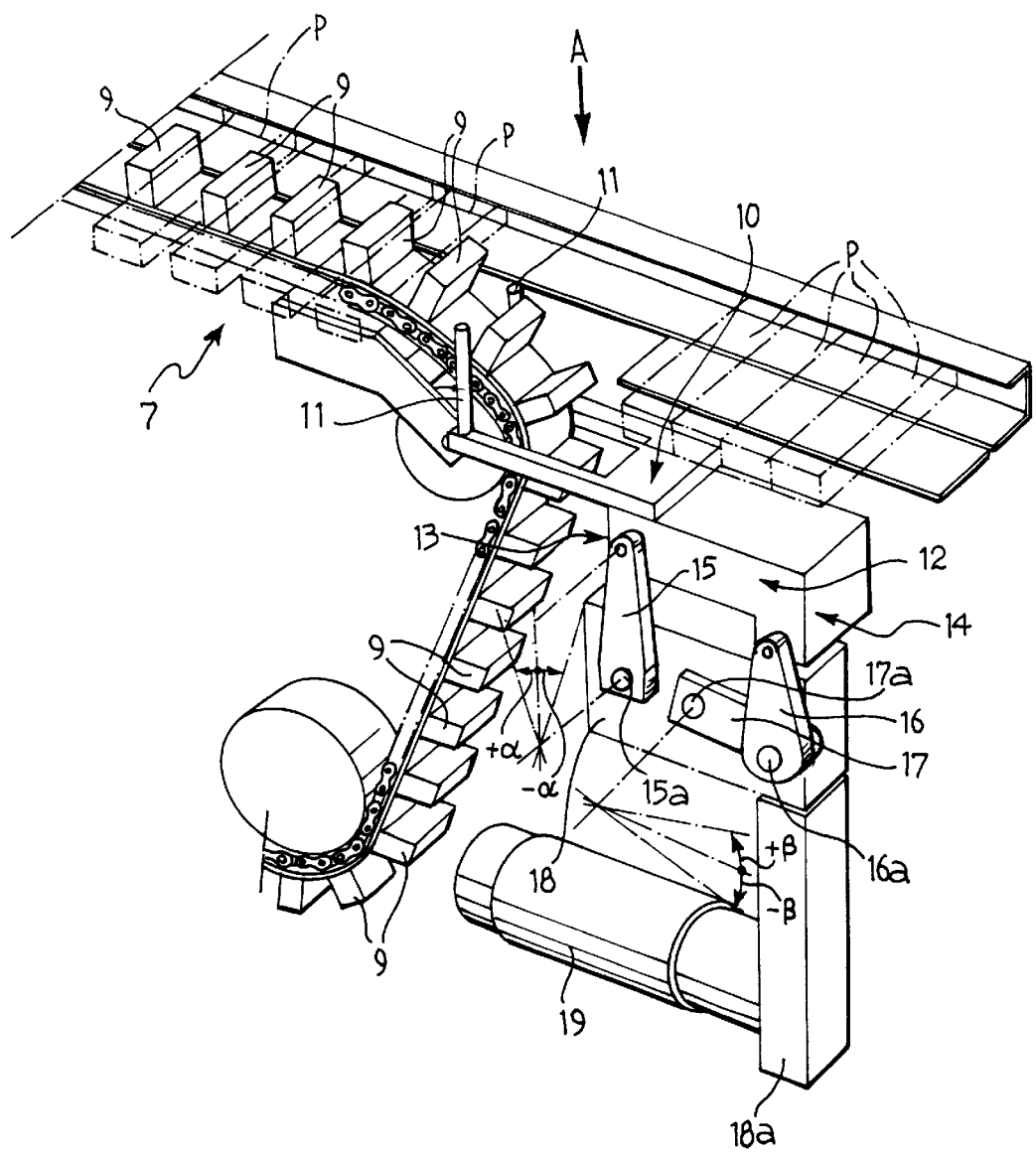
FIG. 2 is a perspective view of the portion of the device according to the invention identified by the arrow II of FIG. 1, with various parts removed for clarity of illustration.

Whatever the nature of the articles P, for the sealing and cutting unit 1 to be able perform its function of creating the individual packages each containing a predetermined number (six in the embodiment shown) of articles P, spaces S have to be formed periodically in the continuous flow of articles P which is presented at the input of the machine (at the left-hand end with reference to the viewpoint of FIGS. 1 and 2). These spaces have to be formed in precisely predetermined positions and to be of a length such as to permit the penetration of the jaws of the unit 1 with consequent squeezing, sealing and cutting of the tubular wrapper, without any article P being accidentally and undesirably squashed.

As can best be seen from the left-hand portion of FIG. 1, in which the input end of the plant according to the invention can be seen, the articles P are supplied in a regular flow which provides for a certain spacing between successive articles. This enables spaces S to be formed as a result of a gradual gathering together of the articles P.

The even spacing of the articles P entering the machine can be achieved by means of a normal conveyor 7, for example, in the form of a chain conveyor driven by a motor 8 and having respective entrainment elements (so-called "dogs") 9. The intervals separating the dogs 9 correspond to the distance between the articles P. The methods which regulate the loading of the articles P onto the loader 7 are known in the art and do not need to be described herein.

For reasons described further below, the dogs 9 preferably have a certain length in the direction of advance of the respective conveyor 7.

An important characteristic of the solution according to the invention is that the gathering together of the articles P with the consequent formation of the individual groups to be inserted in the multipack packages and the simultaneous formation of the spaces S is not brought about by a periodic stoppage or slowing of the flow of articles P, but, on the contrary, by an a acceleration (or forward thrust). In other words, the articles to be included in each group are not gathered together as a result of the slowing or stoppage of the article situated furthest downstream or furthest forward in the group (meaning in the position furthest to the right as seen in FIGS. 1 and 2) but, on the contrary, as a result of a positive thrust or acceleration imparted by action beginning with the articles situated in the furthest upstream (or rearmost) position in the general direction of advance (that is, in the position furthest to the left in FIGS. 1 and 2). The groups of articles are thus formed as a result of the movement of an article subjected to the thrust towards at least one other article situated in a further forward (or further downstream) position in the flow of articles (in the case of groups including three or more articles, they are usually actually made to lean against one another).

In the currently-preferred embodiment of the invention, this accelerating movement is brought about by means of a drive unit 10 situated beneath the sliding surface 6. The active element of the unit 10 which is intended to act on the articles (P) is constituted by a gripping (or thrust) element 11 constituted, in the currently-preferred embodiment of the invention, by a fork-like element. This can perform a periodic rising movement until it projects above the sliding surface 6 of the articles P in the position in which the flow of articles P advances (the position indicated by the arrow A in the drawings) and in which the dogs 9 of the conveyor 7 leave the articles P and move downwards, following the respective motor-driven chain and disappearing beneath the surface 6.

The fact that the dogs 9 have a certain length in their direction of advance (in other words, the dogs are quite thick in the direction of advance) means that the rising movement of the fork-shaped element 11 and its penetration of the flow of articles P can take place, so to speak, in the shadow of the dogs 9. Thus, the fork-shaped element 11 (the configuration could however be different: for example, it could be a pin- or blade-shaped element, the selection of one or other configuration depending essentially on the structure of the transportation surface 6 and/or on the nature of the articles P) penetrates the flow of articles P without exerting any vertical thrust on the articles P. The element 11 moves upwards whilst it is precisely in the same position of advance in which the dogs 9 move downwards.

As can best be seen in the view of FIG. 2, the element 11 thus constitutes and/or is situated at the distal end of an arm 12, the intermediate portion 13 and the proximal end 14 of which are articulated to two further pivoting arms or rods 15, 16 which may be duplicated on both sides of the arm 12 in order to produce a more balanced structure.

In particular, the arm 15 is articulated at its upper end to the arm 12 at 13 and, on the other hand, can perform a generally pivoting movement of amplitude $-\alpha$, $+\alpha$ relative to a theoretical vertical median plane about its lower end, identified by a horizontal axis 15a. The arm 16 is articulated at its upper end to the proximal end of the arm 12 which is kept in an approximately horizontal position, the arm 16 being articulated at its lower end 16a, on the other hand, to the distal end of a further pivoting arm 17 which can perform a pivoting movement of amplitude $+\beta$, $-\beta$ relative to a theoretical horizontal plane, about a respective horizontal axis 17a.

The axes 15a and 17a are represented physically by two output shafts of a cam mechanism 18 of the type generally known as a Massey Ferguson mechanism. The input shaft of the mechanism in question is driven, via a transmission unit 18a, by an electric motor 19, the operation of which is synchronized (according to known criteria, for example, as a result of common control by the processing device, for example, a so-called PLC, which supervises the operation of the entire plant) with the motor 8 which drives the input conveyor 7.

According to known criteria, the mechanism 18 can be regulated by alteration of both the relative phases and the amplitudes of the movements of the arms 15 and 17 so as to impart to the distal end of the arm 12 which carries the element 11 an orbital movement which provides for the cyclic repetition of the following operating phases:

rising of the element 11 from a position generally below the sliding surface 6 of the articles P, with the insertion of the element 11 (which moves upwards in the shadow of a respective dog 9) behind an article P; this article P is to constitute the last article (that is, the furthest upstream or rearmost article, with reference to the general direction of advance of the articles P) of a respective group of n articles P (n=6 in the embodiment illustrated) inserted in a single multipack package, an active forward stroke of the element 11 which projects above the surface 6, with consequent forward movement of the article P engaged at the time in question; this imparts to the article P in question an acceleration which brings it close to the article immediately downstream and then also brings the two articles thus grouped close to the next article further downstream, and so on, until a group of articles P (six in the embodiment illustrated) has been gathered together, disengagement of the element 11 from the group of articles P thus formed (which now advances entrained by the tubular wrapper), as a result of the lowering of the element 11 below the sliding surface 6, and a return stroke of the element 11 to the waiting position beneath the sliding surface 6 in order to repeat the cycle described above from the starting region or position indicated by the arrow A.

Clearly, the magnitude of the acceleration, and hence the extent of the gathering-together and accumulation of the articles P brought about by the device 10, varies according to the number of articles to be grouped and/or the lengths of the spaces S to be created.

The solution according to the invention has the advantage that this magnitude, and hence the result of the operation of the device 10, is independent of the geometry of the device 10 (particularly the length of the various arms of which it is composed) and depends solely upon the speed at which the element 11 performs its acceleration (thrust) stroke on the articles P. This can easily be understood if it is kept in mind that, if the element 11 were to perform its "active" stroke at a speed identical to the speed of the input flow of articles P there would be no thrust or gathering-together but that, if, on the other hand, the element 11 were to move at infinite speed it would virtually squash all of the articles P within the length of its stroke against one another.

The device 10 can consequently be adapted to entirely different operating conditions (dimensions of the articles P in the direction of advance thereof, number of articles to be grouped, extent and number of spaces S, etc.) without the need to perform any modification or replacement of parts in the device; in order to achieve adaptation to different operating conditions, in fact it suffices to alter (according to known criteria) the laws for the operation of the motor 19 so as to change the speed of operation of the device 10.

The above-described drive mechanism of the element 11, comprising the arm 12 and its kinematic drive mechanism connected to the mechanism 18 and the motor 19, constitutes one of many possible embodiments of the drive function. Naturally, many variants are possible and their structural details can be defined by an expert in the art once the general operating criteria have been identified.

To mention two possible examples, an orbital movement such as that indicated schematically by the arrow B in FIG. 2 could be brought about by the mounting of the element 11 on a device which can perform an orbital movement along a circular path (which can be seen as a special case of the elliptical path described above). In this case, the element 11 could be mounted, for example, on a straight device extending so as to connect two wheels with parallel horizontal axes disposed side by side in the direction of advance of the articles P beneath the surface 6. The rotation of the assembly thus produced (substantially comparable to a locomotive wheel unit) imparts to the element 11 a circular orbital movement comprising an upper semicircular path defining an active stroke in which it rises towards the articles P, exerts a thrust according to the criteria described, and subsequently descends until the articles P are released, as well as a lower semicircular path defining a return stroke towards the starting position. Another solution could be to provide for the element 11 to be mounted on a respective annular entrainment element such as, for example, a motor-driven chain, according to criteria substantially similar to those adopted for the dogs 9 of the conveyor 7.

The solution described with reference to the drawings, is considered preferable, however, at least at the moment.

Naturally, the principle of the invention remaining the same, the details of construction and forms of embodiment may be varied widely with respect to those described and illustrated, without thereby departing from the scope of the present invention.

What is claimed is:

1. In a device for forming groups of articles from an input flow of articles, each group containing a predetermined number of articles and the groups being separated by spaces, the device having:

a conveyor for receiving the input flow of articles and imparting a given speed of advance thereto; and a group-forming structure which can interact with the flow of articles in order to bring about the formation of the groups by selective modification of the speed of advance of at least some of the articles;

the improvement wherein the group-forming structure comprises a thrust element to selectively exert a thrust on the articles as a result of a movement, at a speed generally greater than the speed of advance of the articles in the flow, so that the groups of articles are formed as a result of the movement of a first article which is subjected to the action of the thrust element towards at least one second article situated in a position farther forward in the flow;

wherein the thrust element has an associated drive mechanism to impart to the thrust element a path of movement comprising at least one active stroke in which the thrust element engages the articles starting from an initial position and exerts the thrust, and a return stroke in which the thrust element returns to the initial position when the articles have been released; and wherein the drive mechanism comprises:

a support arm carrying the associated thrust element at a respective distal end;

a first drive arm which supports the support arm in a generally intermediate position, the first drive arm being capable of a pivoting movement ($-\alpha$, $+\alpha$) relative to a theoretical vertical plane about a respective substantially horizontal axis;

a second drive arm connected to the proximal end of the support arm, the second drive arm having an opposite end to the support arm connected to a third drive arm which is capable of a pivoting movement ($-\beta$, $+\beta$) relative to a theoretical horizontal plane about a respective substantially horizontal axis; and the arrangement being such that a cyclic movement along a substantially elliptical path is imparted to the thrust element.

2. The device of claim 1, wherein:

the conveyor means comprise elements for entraining the articles, the elements having a certain length in the direction of advance of the conveyor means;

the entrainment elements are configured so as to release the articles in a predetermined region of the path of advance of the articles; and the thrust element is configured to act on the articles starting from the predetermined region.

3. The device of claim 2, wherein:

the entrainment elements release the articles in the predetermined region descending movement as a result of a general rising movement, and the thrust element engages the articles in the predetermined region as a result of a general rising movement.

4. The device of claim 1, wherein the conveyor means comprise an entrainment member having elements constituted by dogs for engaging the articles.

5. The device of claim 1, wherein the conveyor means comprise a chain entrainment body.

6. The device of claim 1, wherein the thrust element is generally fork-shaped.

7. The device of claim 1, wherein the drive mechanism imparts a rising movement and a descending movement to the thrust element at the beginning and at the end of the active stroke, respectively.

8. The device of claim 1, wherein the thrust element exerts the thrust on the articles during an active stroke of fixed length.

9. The device of claim 8, wherein drive means are associated with the thrust element and impart thereto a selectively variable speed of operation on the articles.

10. The device of claim 1, in combination with a packaging machine of the flow-pack type for forming wrappers containing a predetermined number n of articles, wherein the device is located upstream of at least one sealing and cutting unit for forming the wrappers.

* * * * *